United States Patent
Strickland et al.

(10) Patent No.: US 7,328,454 B2
(45) Date of Patent: Feb. 5, 2008

(54) SYSTEMS AND METHODS FOR ASSESSING COMPUTER SECURITY

(75) Inventors: Jeffrey Thomas Strickland, Birmingham, AL (US); John David Ensminger, Birmingham, AL (US); Terry Allen Hester, Helena, AL (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 663 days.

(21) Appl. No.: 10/422,134

(22) Filed: Apr. 24, 2003

(65) Prior Publication Data

US 2004/0250116 A1 Dec. 9, 2004

(51) Int. Cl.
- G06F 11/00 (2006.01)
- G06F 12/14 (2006.01)
- G06F 12/16 (2006.01)
- G06F 15/18 (2006.01)
- G08B 23/00 (2006.01)
- H04L 9/32 (2006.01)

(52) U.S. Cl. .................. 726/25; 726/23; 726/24; 713/188

(58) Field of Classification Search .............. 726/22, 726/23, 24, 25; 713/188
See application file for complete search history.

(56) References Cited

U.S. PATENT DOCUMENTS

| | | | | |
|---|---|---|---|---|
| 5,684,957 | A * | 11/1997 | Kondo et al. | 726/25 |
| 6,205,551 | B1 * | 3/2001 | Grosse | 726/25 |
| 6,311,214 | B1 * | 10/2001 | Rhoads | 709/217 |
| 6,772,345 | B1 * | 8/2004 | Shetty | 726/24 |
| 6,952,776 | B1 * | 10/2005 | Chess | 713/188 |
| 7,191,438 | B2 * | 3/2007 | Bryant | 717/176 |
| 2001/0034847 | A1 * | 10/2001 | Gaul, Jr. | 713/201 |
| 2002/0069370 | A1 * | 6/2002 | Mack | 713/201 |
| 2003/0033400 | A1 * | 2/2003 | Pawar et al. | 709/223 |

* cited by examiner

Primary Examiner—Benjamin E. Lanier
(74) Attorney, Agent, or Firm—Scott P. Zimmerman, PLLC; Geoff Suzcliffe; Jodi Hartman

(57) ABSTRACT

A computer-implemented method includes establishing a logon connection between a host system and one or more client systems through a network; assessing computer security at the host system by scanning each client system after logon; parsing data obtained by scanning each client system; and generating output files containing parsed data.

Implementations may include scanning for one or more of: Ethernet adapters, operating system, computer name, anti-virus installation, security information, mounted drives, local user information, services, audit policies, shared drives, trusted domains, Internet uniform locators, installed applications, images and movies.

17 Claims, 8 Drawing Sheets

SYSTEMS AND METHODS FOR ASSESSING COMPUTER SECURITY

TECHNICAL FIELD

The present invention relates generally to systems and methods for collecting and analyzing data and, more particularly, to systems and methods for assessing computer security.

BACKGROUND

In order to preserve the integrity of its computer system, a company typically maintains an information technology (IT) department that is responsible for setting security standards for compliance. Verifying compliance with security standards often involves determining the security settings on the system, determining the software installed on the system, determining the Internet Web sites visited by users of the system, collecting and compiling data from the system in a meaningful way, and ensuring compliance for all servers and all workstations in the system.

In the past, remote scanners have been used to determine the security settings of a computer. The effectiveness of such remote scanners has been limited, however, due to the inability to check all the settings needed to verify compliance with the standards set forth by the security department. Accordingly, IT personnel often must go from computer to computer and manually check the settings that could not be checked using the remote scanner. Performing a complete verification of all computers thus may require a significant amount of time.

Determining installed software traditionally has been accomplished by scanning an individual computer. Scanning can be done locally by performing a manual check of the computer for installed software or remotely by using a Systems Management Server (SMS), for example. These methods have significant drawbacks. In particular, performing manual scanning takes a large amount of time. In addition, SMS methods require file shares to be open in order to perform scanning, which exposes the system to a potential security risk.

Determining the Internet Web sites visited by company personnel generally has been a time consuming process involving the examination of uniform resource locators (URLs) kept by an Internet proxy. Because the Internet proxy logs contain information for all users, the volume of information is much more than required to perform the test work necessary. Sifting through such a vast amount of information is burdensome and time consuming. Furthermore, since users are able to change their Internet protocol (IP) address, it often is difficult to use the logs to pinpoint a particular user for a given date and time.

Collecting and compiling data in a meaningful way also has been problematic. Typically, data is gathered from many diverse sources and processes throughout the system. Once the data has been collected, IT personnel must manually parse through it in order to glean useful information about the system. At times, IT personnel have created and used parsing programs; however, the uses of such parsing programs are limited due to the lack of standardization.

Previously, ensuring compliance for all servers and all workstations in the system has been accomplished by manually testing each machine. In addition to taking a long time to perform, the version and/or operating system used on the machine was not determined.

Accordingly, systems and methods for assessing computer security are needed to overcome the deficiencies mentioned above.

SUMMARY

In one general aspect, a computer-implemented method includes establishing a logon connection between a host system and one or more client systems through a network; assessing computer security at the host system by scanning each client system after logon; parsing data obtained by scanning each client system; and generating output files containing parsed data.

Implementation may include scanning for one or more of: Ethernet adapters, operating system, computer name, antivirus installation, security information, mounted drives, local user information, services, audit policies, shared drives, trusted domains, Internet uniform locators, installed applications, images and movies.

Aspects of the present invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DETAILED DESCRIPTION

In one general aspect, the present invention is directed to systems and methods for assessing computer security. For simplicity, the basic components of such systems and methods are provided. However, as would be understood by one of ordinary skill in the art, the systems and methods described below may include various other structures and/or processes in actual implementation consistent with aspects of the present invention.

Figure 1:
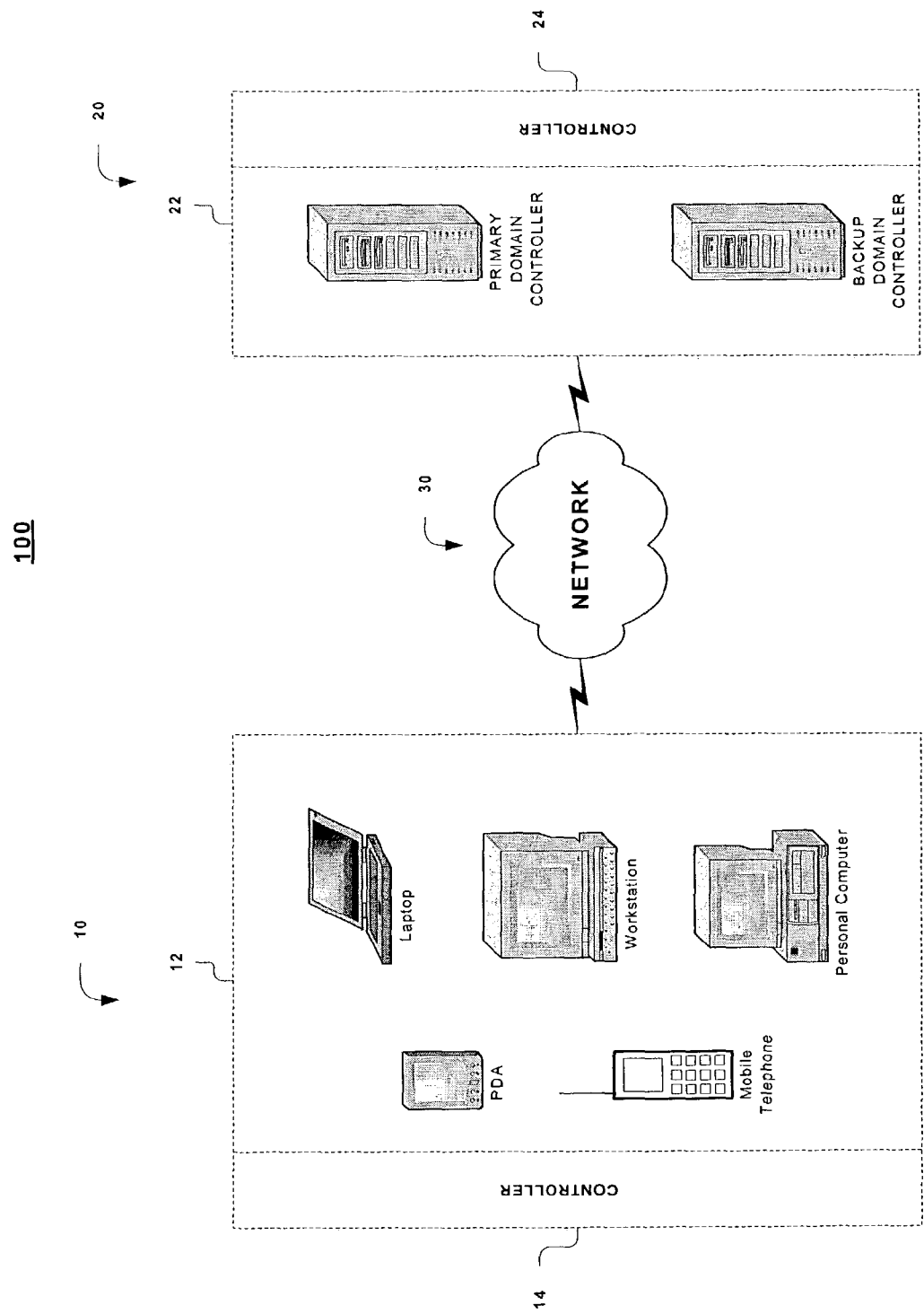
FIG. 1 illustrates one embodiment of a communications system for assessing computer security according to the present invention.

FIG. 1 illustrates one embodiment of a communications system 100 for assessing computer security. As shown, the communications system 100 includes a client system 10 connected through a network 15 to a host system 20. In general, the client system 10 includes a computer system having hardware and/or software components for communicating with the network 15 and the host system 20. The client system 10 and host system 20 may be structured and arranged to communicate through the network 15 using various communication protocols (e.g., http, TCP/IP, WAP, UDP) and/or to operate within or in concert with one or more other communications systems.

In one implementation, the client system 10 and the host system 20 each include a device (e.g., client device 12, host device 22) operating under the command of a controller (e.g., client controller 14, host controller 24). The broken lines are intended to indicate that in some implementations, the controller, or portions thereof considered collectively, may instruct one or more elements of the device to operate as described.

Examples of a device include, but are not limited to, a personal computer (PC), a workstation, a server, a laptop computer, a network-enabled telephone, a network-enabled personal digital assistant (PDA), a microprocessor, an integrated circuit, or any other component, machine, tool, equipment, or some combination thereof capable of responding to and executing instructions.

Examples of a controller include, but are not limited to a computer program, a software application, computer code, set of instructions, plug-in, applet, microprocessor, virtual machine, device, or combination thereof, for independently or collectively instructing one or more computing devices to interact and operate as programmed.

The controller may be implemented utilizing any suitable computer language and may be embodied permanently or temporarily in any type of machine, component, physical or virtual equipment, storage medium, or propagated signal capable of delivering instructions to a device. The controller (e.g., software application, computer program) may be stored on a computer-readable medium (e.g., disk, device, and/or propagated signal) such that when a computer reads the medium, the functions described herein are performed.

The network 15 may include any type of delivery system including, but not limited to a local area network (e.g., Ethernet), a wide area network (e.g., the Internet and/or World Wide Web), a telephone network (e.g., analog, digital, wired, wireless, PSTN, ISDN, and/or xDSL), a radio network, a television network, a cable network, a satellite network, and/or any other wired or wireless communications network configured to carry data. The network 15 may include elements, such as, for example, intermediate nodes (e.g., an internal corporate modem pool), proxy servers, routers, switches, adapters, and wired or wireless data pathways, configured to direct and/or deliver data.

The host system 20 may include a set of resources (e.g., applications) for a group of users. Such resources may be located on a number of different servers (not shown) in the host system 20. In one embodiment, to access the resources of the host system 20, a user may log in through a domain controller. Examples of a domain controller include, but are not limited to, a primary domain controller (PDC) and a backup domain controller (BDC). The PDC and BDC may be installed on one or more servers (e.g., stand-alone Windows NT™ servers) in the host system 20.

In one implementation, the PDC may manage one or more databases (e.g., user databases) for the host system 20. The PDC may transmit database information at selected intervals to one or more other servers (e.g., stand-alone Windows NT™ servers) designated as a BDC in order to preserver the integrity of the host system 20. In some situations, the BDC may assume functions of the PDC, for example, if the PDC fails and/or if the BDC is needed to balance workload.

Figure 2:
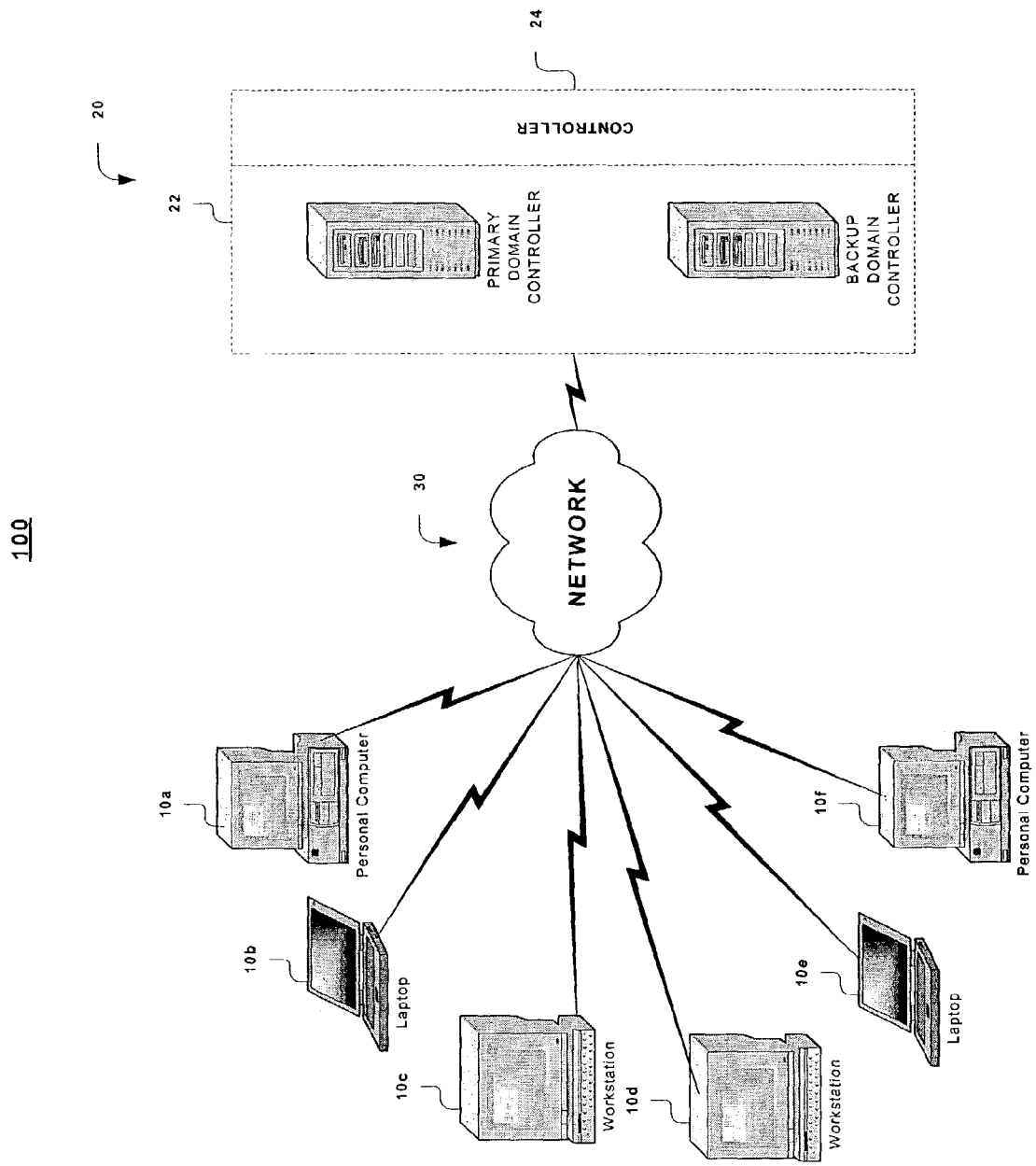
FIG. 2 illustrates one embodiment of a communications system for assessing computer security according to the present invention.

FIG. 2 illustrates one embodiment of a communications system 100 for assessing computer security. As shown, the communications system 100 includes a plurality of client systems 10 connected through the network 15 to the host system 20.

Figure 3:
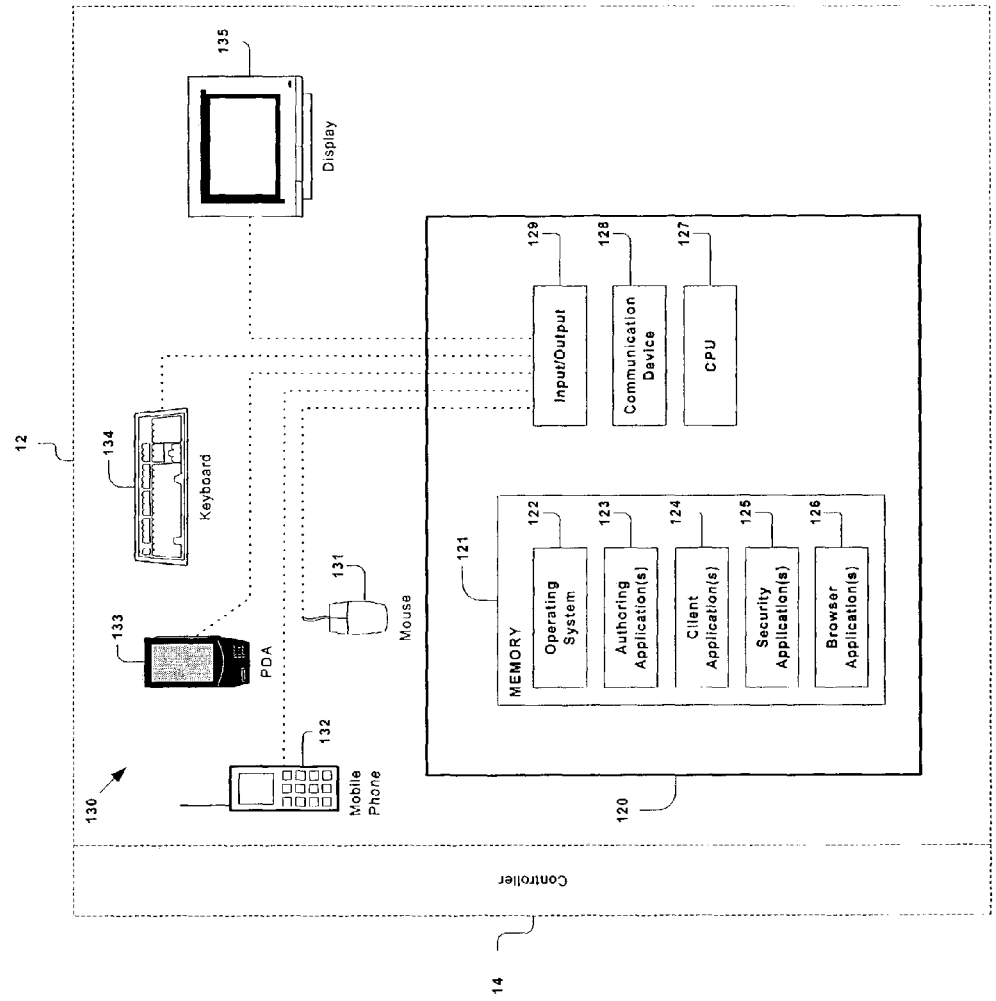
FIG. 3 illustrates one embodiment of a client system according to the present invention.

FIG. 3 illustrates one embodiment of a client system 10 including a client device 12 and a client controller 14. In one implementation, the client device 12 includes a general purpose computer 120 having an internal or external storage 121 for storing data and programs such as an operating system 122 (e.g., DOS, Windows™, Windows 95™, Windows 98™, Windows 2000™, Windows NT™, OS/2, or Linux) and one or more application programs. Examples of application programs include authoring applications 123 (e.g., word processing, database programs, spreadsheet programs, or graphics programs) for generating documents or other electronic content; client applications 124 for communicating with other computer users, accessing various computer resources, and viewing, creating, or otherwise manipulating electronic content; security applications 125 for protecting the computer against hacking and/or computer viruses; and browser applications 126 (e.g., Netscape's Navigator or Microsoft's Internet Explorer) for rendering standard Internet content.

The general-purpose computer 120 may include a central processing unit (CPU) 127 for executing instructions and a communication device 128 for sending and receiving data. Examples of a communication device 128 include, but are not limited to, a modem, a communication card, a transceiver, an antenna, and/or another network adapter capable of transmitting and receiving data over wired and/or wireless channels.

The general-purpose computer 121 also may include an input/output interface 129 for wired or wireless connection to various peripheral devices 130. Examples of peripheral devices 130 include, but are not limited to, a mouse 131, a mobile phone 132, a personal digital assistant 133 (PDA), a keyboard 134, and a display monitor 135. Although devices such as a mobile telephone 132 and a PDA 133 are illustrated as being peripheral with respect to the general-purpose computer 121, in some cases, such devices may include the functionality of the general-purpose computer 121 and operate as the client device 12. Furthermore, the client device 12 may include any, some, or all of the components and devices described above.

In operation, the communications system 100 may implement various procedures for assessing computer security. The communications system 100 may be configured to display one or more graphical user interfaces in connection with various steps of the procedures. Such procedures may be performed by the system 100 in tandem with and/or at the direction of one or more programs. Examples of a program include, but are not limited to, a computer program, a software application, computer code, set of instructions, plug-in, applet, or combinations thereof, for independently or collectively instructing one or more computing devices to interact and operate as instructed.

Figure 4:
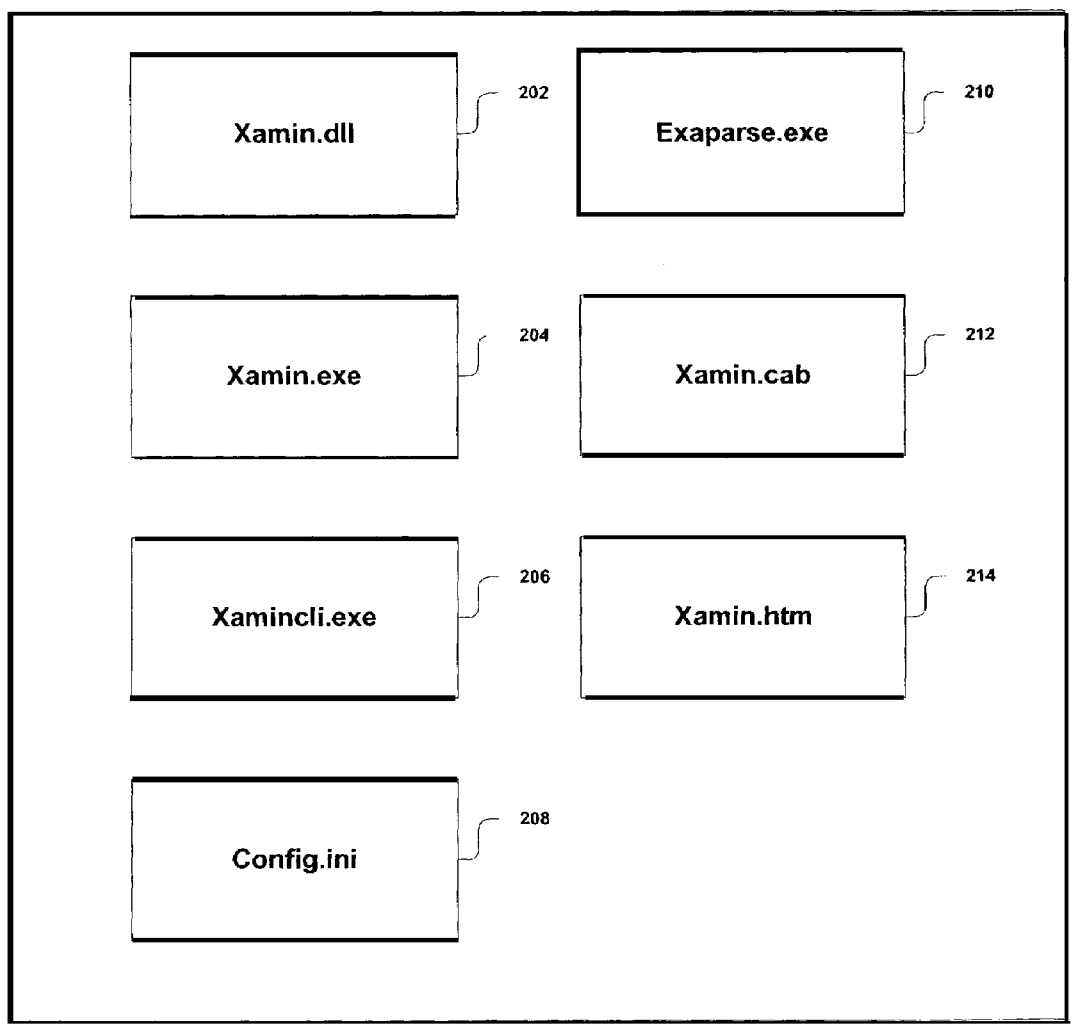
FIG. 4 illustrates one embodiment of a computer program for assessing computer security according to the present invention.

FIG. 4 illustrates one embodiment of a program 200 for assessing computer security according to the present invention. In general, the computer program 200 may utilize any suitable algorithms, computing language (e.g., C, C++, Visual Basic, VBScript, Java, JavaScript, Delphi), and/or object-oriented techniques. In one embodiment, the computer program 200 may be implemented using ActiveX technology built in to a browser application (e.g., Microsoft's Internet Explorer). In some implementations, the computer program 200 may be placed on a web site for allowing a user to assess the security of a computer system.

The program 200 may be embodied permanently or temporarily in any type of computer, computer system, device, machine, component, physical or virtual equipment, storage medium, or propagated signal capable of delivering instructions. The program 200 when implemented as software or a computer program, for example, may be stored on a computer-readable medium (e.g., device, disk, or a propagated signal) such that when a computer reads the medium, the functions described herein are performed.

In general, the program 200 may verify settings on client systems (e.g., workstations and/or servers) without having to manually go to each client system. The program 200 may be deployed in a small number of locations, and can be used to collect data from a large number of client systems in a very short amount of time. The data collected can be used for a number of different purposes, including security configuration verification, software inventory control, and Internet activity monitoring.

For example, a security department may use the program 200 to check a large number of computer systems from a central location. In addition, the program 200 may be placed a web site to allow users to perform a "self-assessment" of the security of their system, using ActiveX technology, for example. Inventory personnel may use the program 200 to determine what type of programs are installed on the computers to ensure that they have an adequate number of licenses for each piece of software. Also, the program 200 may be used to analyze the Internet activity conducted by each client system. This may be accomplished, for instance, by putting the command line version of the program in the users login script on their primary domain controller (PDC) so that the security of each user's client system (e.g., Windows-based PC) is evaluated is when the user logs into the domain.

In one embodiment, the program 200 includes several components including an Xamin.dll file 202, an Xamin.exe file 204, an Xamincli.exe file 206, a Config.ini file 208, an Exaparse.exe file 210, an Xamin.cab file 212, and an Xamin.htm file 214.

The Xamin.dll file 202 may include the backend code required to perform a scan of a computer system. For example, the Xamin.dll file 202 may contain code, which pulls information, places the information into a series of data structures, and passes data to a particular program that called the Xamin.dll file 202. In one implementation, the Xamin.dll file 202 performs the backend processing functions for the Xamin.exe file 204 and the Xamincli.exe file 204. In general, the Xamin.dll file 202 will be in the same directory as the executable being run.

The Xamin.exe file 204 may be implemented as a graphical user interface (GUI) version of the software. In one implementation, the Xamin.exe file 204 may perform a manual run of the software from an individual system rather than over a login script. The output from the Xamin.exe file 204 may be written to the location from where the program was executed.

The Xamincli.exe file 206 may be a command line interface to the program. In general, the Xamincli.exe file 206 will be the most common version to use for collecting data from a number of different sources. Typically, the Xamincli.exe file 206 may be run from a login script when a user logs in. The output of the Xamincli.exe file 206 may be written to the location of the executable file. If an argument is given, it must be a fully qualified pathname to output the files to a directory different from the directory in which the executable resides.

The Config.ini file 208 may contain the configuration information used by the executable programs to determine which tests to run. In one implementation, the Config.ini file 208 may be used for "on-the-fly" configuration of the programs run by the Xamin.exe file 204 and the Xamincli.exe file 206.

The Exaparse.exe file 210 may be implemented as a program that takes the output from the Xamin.exe file 204 and the Xamincli.exe file 206, parses the output, and generates new files containing the crucial data collected from the other data files. The data contained in the new files may be sectioned into their own components and semi-colon delimited for simplifying the importation of the data into a spreadsheet and/or database software program.

The Xamin.cab file 212 may contain a control (e.g., ActiveX Control), a dll file and an inf file needed to install the control when a web page is viewed. The Xamin.htm file 214 may implemented as a web paged used with the Xamin.cab file 212. The page may interact with a browser application (e.g., Microsoft's Internet Explorer) to install and run the Xamin AciveX control.

Figure 5:
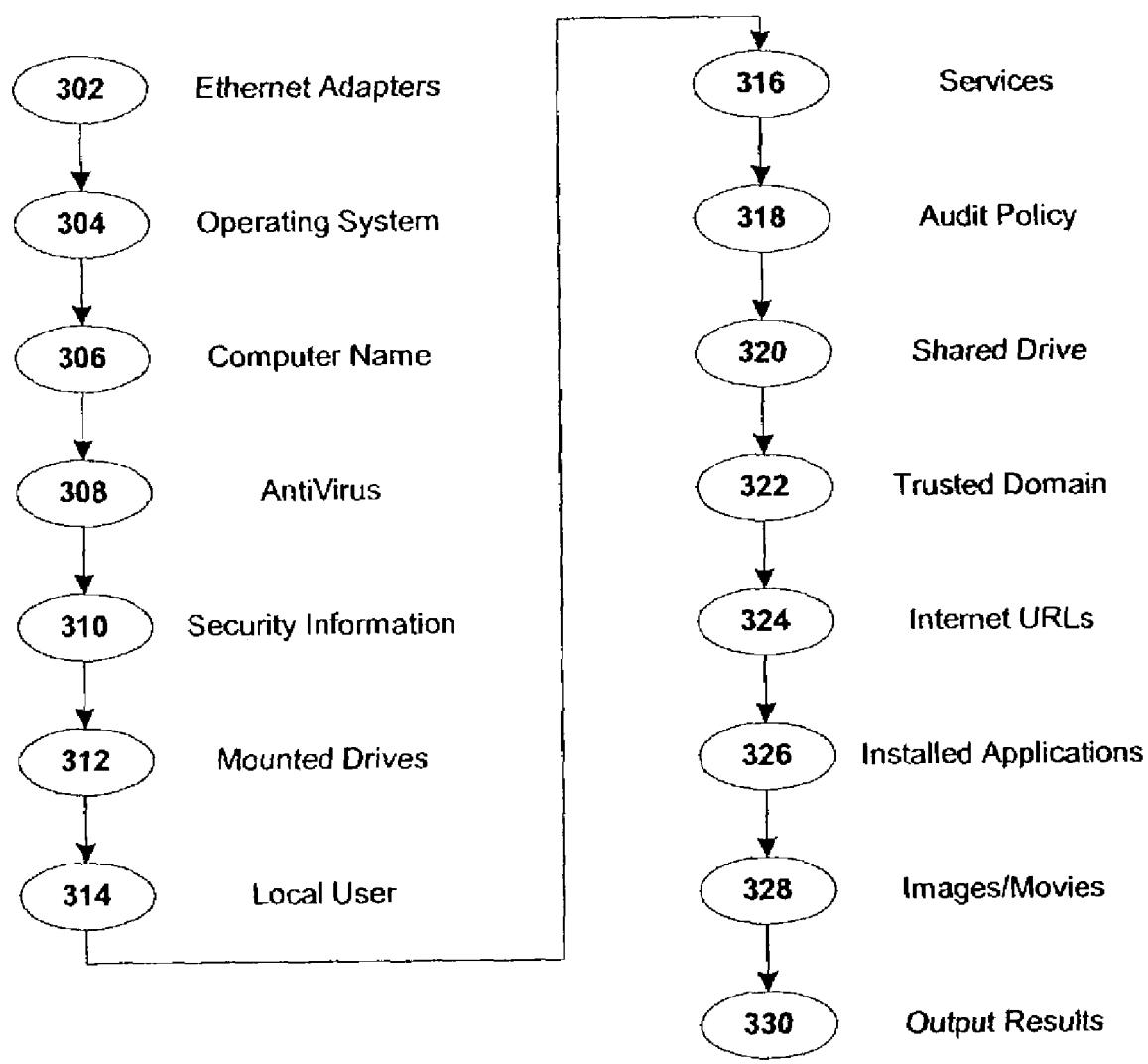
FIG. 5 is a flowchart of one embodiment of a method for assessing computer security according to the present invention.

A method 300 for assessing computer security is illustrated in FIG. 5. The method 300 may be implemented by any suitable type of hardware (e.g., device, computer, computer system, equipment, component); software (e.g., program, application, instruction set, code); storage medium (e.g., disk, device, propagated signal); or combination thereof. For example, the method 300 may be performed by one or more elements of the communications system 100 and/or the program 200.

At step 302, scanning for Ethernet adapters may be performed. In one implementation, the Internet Protocol (IP) addresses associated with the Ethernet adapters may be acquired.

At step 304, scanning for operating system (OS) characteristics may be performed. In one implementation, the OS version, build, and service pack version information may be acquired.

At step 306, scanning for computer name may be performed. In one implementation, the computer's NetBIOS name may be acquired.

At step 308, scanning for antivirus installation may be performed. In one implementation, information regarding the last virus scan and the last virus update may be acquired.

At step 310, scanning for security information may be performed. In one implementation, acquired security information may include one or more of:

Screen Saver Active, Password Protected, Timeout
Legal Notice Text and Caption, or default background image showing logon banner
Auto Logon Enabled
Last User Displayed
Shutdown Without Logon
Anonymous Restricted (NULL Sessions)
Minimum Password Length
Minimum and Maximum Password Age
Password History
Lockout Duration, Lockout Window, Lockout Threshold
POSIX and OS2 Registry Keys Installed
Password Filtering (PASSFILT)

At step 312 scanning for mounted drives may be performed. In one implementation the scanning is performed locally. The acquired information may include one or more of:

File System Type (FAT, FAT32, NTFS, etc.)
Case Is Preserved
Support Case Sensitive
Support Unicode
Support Persistent ACLS
Support File Compression
Volume Is Compressed
Support EFS
Support Object ID
Support Reparse Points At step 314, scanning for local user information may be performed. In one implementation, the acquired local user information may include one or more of:
Username
Full Name
Privileges
Disabled
Locked Out
Comment
User Comment
Password Required
Can User Change Password
Password Age
Password Expire
Password Expiration Date
Last Logon Date
Support Reparse Points At step 316, scanning for services may be performed. In one implementation, the services are NT services. The acquired information may include one or more of service name and status of the service.

At step 318, scanning for audit policy information may be performed. In one implementation, the acquired information may include one or more of:
Auditing Enabled
Type Of Auditing For Events (None, Success, Failure, or Success AND Failure)
Audit System Events
Audit Logon Events
Audit Object Access
Audit Privilege Use
Audit Process Tracking
Audit Policy Change
Audit Account Management
Audit Directory Service Access
Audit Account Logon Events At step 320, scanning for shared drive information may be performed. In one implementation, the acquired information may include one or more of: share name, share type, and share comments.

At step 322, scanning for trusted domain information may be performed. In one implementation, each trusted domain may be listed according to host.

At step 324, scanning for Internet URLs may be performed. In one implementation, each URL found for a browser application (e.g., Microsoft's Internet Explorer or Netscape's Navigator) may be listed.

At step 326, scanning for installed applications may be performed. In one implementation, each application installed may be listed according to registry.

At step 328, scanning for images and movies may be performed. In one implementation, the scan may be either for filtered or unfiltered content. Extensions may be hard-coded into the program.

At step 330, outputting the results of the scanning for parsing and analysis may be performed.

In one embodiment, the method 300 may be performed by one or more elements of the program 200 such as the GUI interface (e.g., Xamin.exe 204) and/or the CLI interface (e.g., Xamincli.exe 206). When implemented by the GUI interface or the CLI interface, the method 300 may involve one or more of: utilizing the Xamin.dll file 202 for backend processing, utilizing the Config.ini 208 file for "on-the-fly" configuration, outputting a Private/Proprietary/Lock banner on each output file, and outputting a banner indicating basic scan information.

The method 300 also may involve writing to a temporary file name if a file already exists in the name of the computer. In one implementation, the CLI interface may accept one argument passed to the program, which allows the program to direct the output to a different directory. For example, the executable may be executed as "C:\Xamin\XaminCLI.exe D:\output\" to direct the output to the "D:\output\" directory instead of the "C.\Xamin\" directory, as long as the output directory is a fully qualified path name.

As described above, elements of the program 200 may include a DLL file (e.g., Xamin.dll 202) for backend processing and a parser program (e.g., Exaparse.exe file 210). In one embodiment, the parser program parses the output from the GUI interface (e.g., Xamin.exe file 204) and/or the CLI interface (e.g., Xamincli.exe file 206) and generates new files containing the crucial data collected from the other data files. In some implementations, the filename to parse may be wild carded (*.exa) to process multiple files at once.

In general, the data contained in the new files may be sectioned into their own components and semi-colon (;) delimited for simplifying the importation of the data into a spreadsheet and/or database software program. In one implementation, the output is placed into several (e.g., ten) output files for easy collection of data. The top of each output file may include column names, and the output file names may be hard coded with .txt extensions.

In one embodiment, the parser program (e.g., Exaparse.exe 210) generates the following output files:
outapp.text—Applications Installed
outaud.txt—Auditing Information
outavi.txt—Antivirus Information
outdrv.txt—Drive Information
outimg.txt—Image Information
outsec.txt—Security Information
outshr.txt—File Share Information
outsrv.txt—NT Service Information
outtru.txt—Trust Information
outurl.txt—Internet URL Information
outusr.txt—User Information Below is one example of output for a single system. In general, the output may be loaded into a spreadsheet program for sorting and/or analyzing the data. In some implementations, output for several systems may be acquired and sectioned into appropriate output files.

---
PRIVATE/PROPRIETARY/LOCK
Contains private and/or proprietary information.
May not be used or disclosed outside the BellSouth
companies except pursuant to a written agreement.
Must be stored in locked files when not in use.
---
BellSouth Internal Audit
Xamin (Invisible version) Report
Generated on    : Wed Jan 29 14:14:54 2003
Computer Name   : COMPUTERNAME -continued

```
User Name       : DOMAINNAME\USERNAME
+++++IP ADDRESS INFORMATION
    90.103.195.224    Current IP Address
+++++OPERATING SYSTEM VERSION
    Windows NT 4.0 Build 1381 Service Pack 6
+++++ANTIVIRUS
    Norton Antivirus  7.50
    Last Virus Scan  : 60196/24/19
    Last Virus Update : 1/22/2003
+++++SECURITY
    Screen Saver Active     ? NO
    Legal Notice Caption    ? YES
    Caption Text            : No disclosure outside Company
    Legal Notice Text       ? YES
    Notice Text             : Any unauthorized access to,
                              or misuse of this
systems or data may result in civil and/or criminal prosecution, employee
discipline up to and including discharge, or the termination of
vendor/service contracts. The Berry Company may periodically monitor
and/or audit computer system access/usage. All BellSouth Corporate
security policies apply to this notice. Your usage of this system binds you
to alt policies governing use of this device.
    Auto Logon Enabled       ? NO
    Last User Displayed      ? NO
    Shutdown without Logon   ? NO
    Anonymous Restricted     ? NO
    Min Password Length      ? 6
    Min Password Age         ? 0
    Max Password Age         ? 60
    Password History         ? 12
    Lockout Duration         ? -1 seconds
    Lockout Observ Window    ? 1800 seconds
    Lockout Threshold        ? 6
    POSIX Installed          ? YES
    OS2 Installed            ? YES
+++++PASSWORD FILTERING
    Passfilt key exists      ? NO
+++++DRIVE INFO
    Drive C:\
        Filesystem               ? NTFS
        Case Is Preserved        ? YES
        Support Case Sensitive   ? YES
        Support Unicode          ? YES
        Support Persistent ACLS  ? YES
        Support File Compression ? YES
        Volume Is Compressed     ? NO
        Support EFS              ? NO
        Support Object Id.       ? NO
        Support Reparse Points   ? NO
        Support Sparse Files     ? NO
        Support Disk Quotas      ? NO
    Drive D:\
        Filesystem               ? NTFS
        Case Is Preserved        ? YES
        Support Case Sensitive   ? YES
        Support Unicode          ? YES
        Support Persistent ACLS  ? YES
        Support File Compression ? YES
        Volume Is Compressed     ? NO
        Support EFS              ? NO
        Support Object Id.       ? NO
        Support Reparse Points   ? NO
        Support Sparse Files     ? NO
        Support Disk Quotas      ? NO
+++++GROUP INFORMATION
    Group Name;User Name
+++++USER INFORMATION
    computer name;username;full name;privs;disabled;locked out;
comment;usr comment;password required;user change password;
password age;password expire;password expiration date;last logon date
+++++SERVICES INFORMATION
    Error Open Manager;
+++++AUDIT POLICY INFORMATION
    Auditing Enabled         ? YES
    Audit System Events      ? Success, Failure
    Audit Logon Events       ? Success, Failure
    Audit Object Access      ? Failure
    Audit Privilege Use      ? None
    Audit Process Tracking   ? None
```

-continued

```
    Audit Policy Change          ? Success, Failure
    Audit Account Management     ? Success, Failure
    Audit Directory Service Access  ? None
    Audit Account Logon Events   ? None
+++++SHARED DRIVE INFORMATION
    ADMIN$;Special Type;Remote Admin
    IPC$;Interprocess Communication;Remote IPC
    C$;Special Type;Default share
    D$;Special Type;Default share
+++++TRUSTED DOMAIN INFORMATION
+++++INTERNET URL INFORMATION
    http://www.hp.com
    http://home.microsoft.com
+++++APPLICATIONS
    Backup Exec Remote Agent for Windows NT/2000
    Microsoft Internet Explorer 5.5 and Internet Tools
    Liebert MultiLink
    LiveUpdate
    Microsoft Windows Media Player 6.4
    MSN Messenger Service 3.0
    Microsoft Outlook Express 5
    Proxy Remote Control - Host
    Norton AntiVirus Corporate Edition
```

Figure 6:
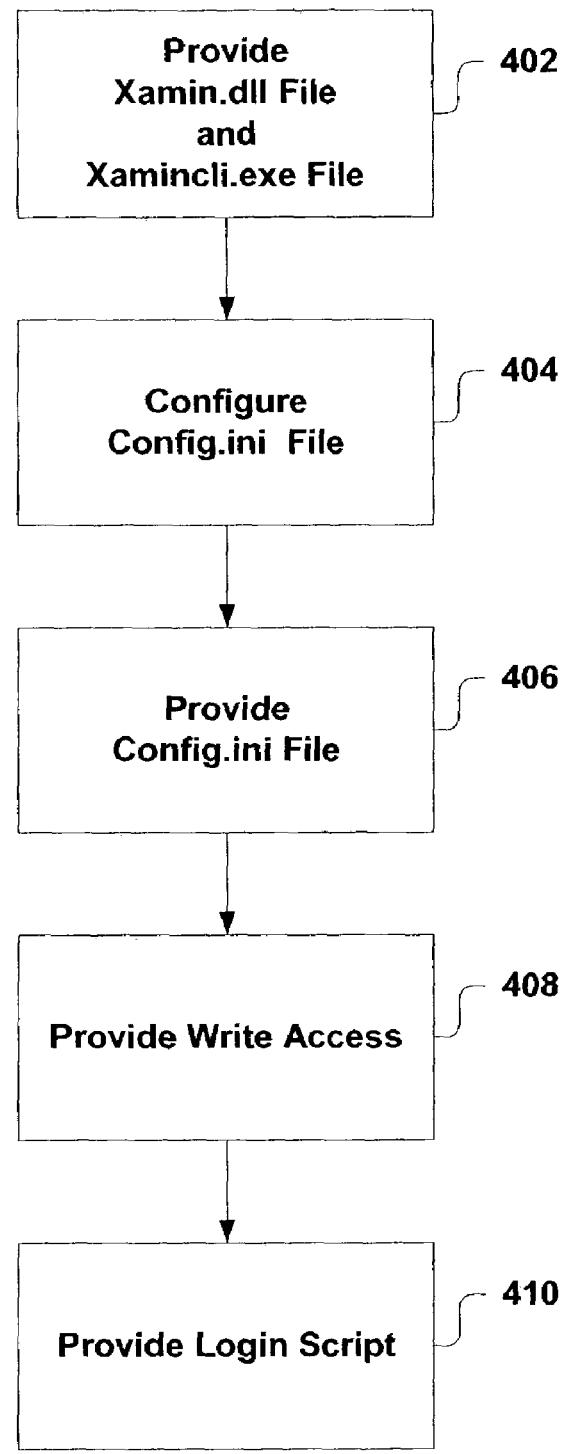
FIG. 6 is a flowchart of one embodiment of a method for assessing computer security according to the present invention.

A method 400 for assessing computer security is illustrated in FIG. 6. The method 400 may be implemented by any suitable type of hardware (e.g., device, computer, computer system, equipment, component); software (e.g., program, application, instruction set, code); storage medium (e.g., disk, device, propagated signal); or combination thereof. For example, the method 400 may be performed by one or more elements of the communications system 100 and/or the program 200.

In one embodiment, at step 402, the method 400 includes providing the xamin.dll file 202 and the xamincli.exe file 206 on one or more servers in the host system 20. In one implementation, the server (e.g., stand-alone Windows NT™ server) may be configured as a domain controller, such as a primary domain controller (PDC) or a backup domain controller (BDC). The Xamin.dll file 202 and the Xamincli.exe file 206 may be provided on the server in a directory that may be shared by all users who will need to execute the program.

The directory may be dedicated and, as such, initially may contain no other files. Depending on the configuration of the server, the directory may be executable, but not readable by all users. In one implementation, the xamin.dll file 202 may be readable by all users, and the xamincli.exe file 206 may be executable.

At step 404, the method may include configuration of the Config.ini file 208. In one embodiment, the config.ini file 208 may be edited such that tests to be performed have a "1" next to them, and the others have a "0" next to them. Any test not listed in the config.ini file 208 may be performed by default.

At step 406, the method 400 may include providing the config.ini file 208 on one or more servers of the host system 20. In one embodiment, the config.ini file 208 may be provided in the directory including the Xamin.dll file 202 and the Xamincli.exe file 206. In one implementation, the Config.ini file 208 may be readable by all users.

At step 408, the method 400 may include providing write access to the server. In general, the directory on the server must be writeable since users that execute the program will write their own files to the directory.

At step 410, the method 400 may include providing a login script for executing the program upon login to the server. In one implementation, the Xamincli.exe file 306 may be executed upon logging into a domain controller (e.g., PDC or BDC). The execution of the Xaminclie.exe file 306 may be the primary mode of the program and generally may a stealth version of the program. That is, when the Xamincle.exe file 206 is executed, a user sees no dialog boxes that indicate that scanning is performed.

In one embodiment, the computer program may be implemented using ActiveX technology built in to a browser application (e.g., Microsoft's Internet Explorer). As such, the program may be placed on a web site and allowing users to remotely assess the security their computer systems.

In one embodiment, the program is not installed on a client system 10 that is scanned. Rather, the program runs in the memory space of the client system 10 and leaves no files on the client system 10. Program files remain where they were executed from, and the output files typically are written to the same directory where the program resides.

Figure 7:
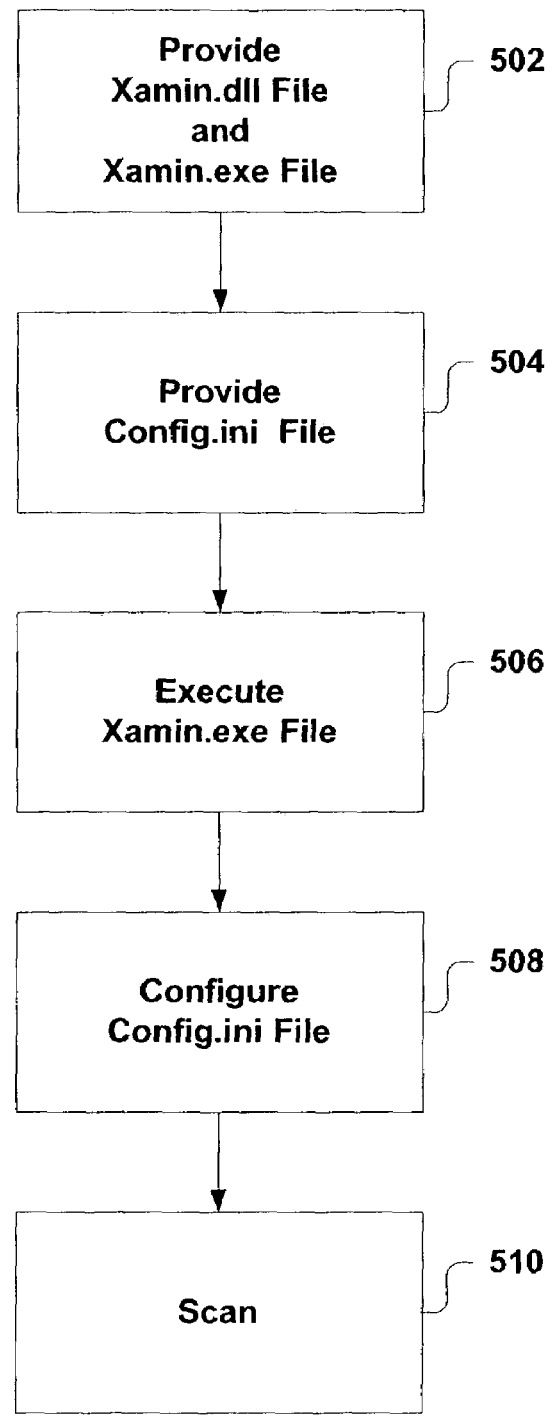
FIG. 7 is a flowchart of one embodiment of a method for assessing computer security according to the present invention.

A method 500 for assessing computer security is illustrated in FIG. 7. The method 500 may be implemented by any suitable type of hardware (e.g., device, computer, computer system, equipment, component); software (e.g., program, application, instruction set, code); storage medium (e.g., disk, device, propagated signal); or combination thereof. For example, the method 500 may be performed by one or more elements of the communications system 100 and/or the program 200.

In one embodiment, at step 502, the method 500 includes providing the Xamin.dll file 202 and the Xamin.exe file 204. In one implementation, the Xamin.dll file 202 and the Xamin.exe file 204 may be provided on the memory space of a client system 10 (e.g. PC, workstation) to be scanned. In another implementation, the Xamin.dll file 202 and the Xamin.exe file 204 may be provided on a diskette. In general, the program is not installed on the client system 10, but rather runs in the memory space of the client system 10. Program files remain where they were executed from, and the output files are written to the same directory where the program resides.

At step 504, the method 400 may include providing the Config.ini file 208. In one implementation, the Config.ini file 208 may be optional, but recommended. In general, the Config.ini file 208 may be provided in the same way as the Xamin.dll file 202 and the Xamin.exe file 204.

At step 506, the method 500 may include executing the Xamin.exe file 204. In one embodiment, the Xamin.exe file 204 may be executed from a diskette and/or from a client system 10 (e.g. PC, workstation) to be scanned.

At step 508, the method 500 may include configuring the Config.ini file 208. In one embodiment, the config.ini file 208 may be edited such that tests to be performed have a "1" next to them, and the others have a "0" next to them. Any test not listed in the config.ini file 208 may be performed by default. In one implementation, upon execution of the Xamin.exe file 204, a GUI may be displayed that allows a user to select testing options for configuring the Config.ini file 208.

At step 510, the method 500 may include scanning a local client system 10. In one embodiment, execution of the Xamin.exe file 204 may be the secondary mode of the program and may be used to manually scan a particular local client system 10 (e.g., PC, workstation). In one implementation, a GUI may be displayed that allows a user to initiate scanning. Another GUI may be displayed when scanning is completed.

Figure 8:
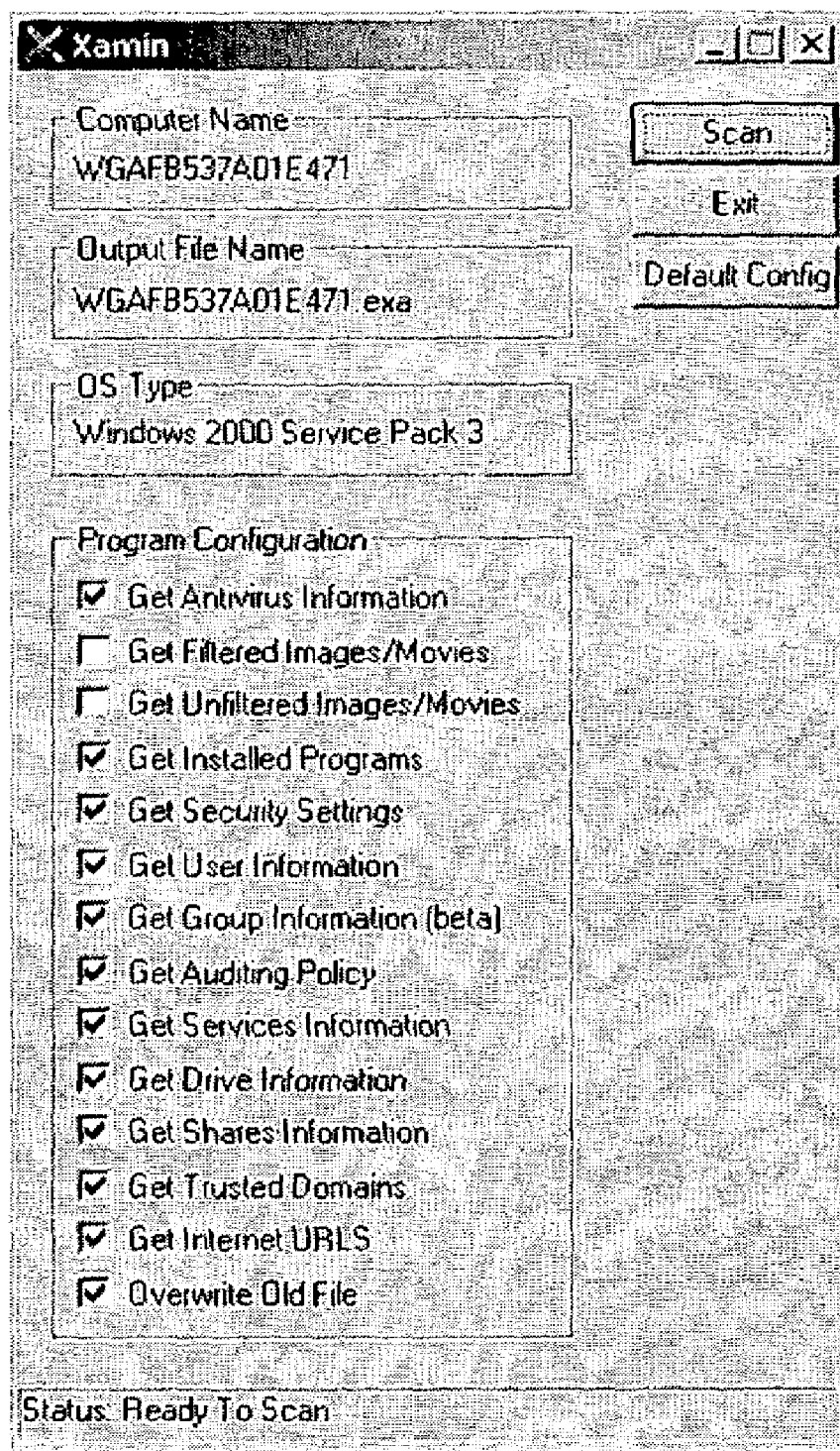
FIG. 8 illustrates one embodiment of a graphical user interface according to the present invention.

FIG. 8 illustrates one embodiment of a GUI that may be used for configuring the program and initiating scanning. As shown, the GUI displays the computer name, the output file name, the OS type, and the program configuration. The GUI also includes a scan button, an exit button, and a default configuration button. Other embodiments of the GUI are possible in accordance with aspects of the present invention.

As described above, the program may be collect security data from the inside out, without ever needing to be "installed" on a client system. Because scanning is performed from the inside out, the program has the ability to collect more security data than prior software.

A number of implementations have been described. Nevertheless, it will be understood that various modifications may be made and that other implementations are within the scope of the following claims.

What is claimed is:

1. A computer-implemented method, comprising:
   storing a Xamin.dll file, a Xamin.exe file, and a Xamincli.exe file in a common directory, the Xamin.dll file performing backend processing for the Xamin.exe file and the Xamincli.exe file;
   adding a command line version of a security program to a client system's login script on a primary domain controller, such that the client system's Internet activity is evaluated upon login to a domain;
   receiving a call for the Xamin.dll file;
   performing a security evaluation of the client system by manual run or by login script;
   if the security evaluation is performed by manual run, then executing the Xamin.exe file from the client system and writing an output created by the Xamin.exe file to the client system;
   if the security evaluation is performed by login script, then i) establishing a logon connection between a host system and the client system through a network, ii) executing the Xamin.exe file from the host system, and iii) writing the output created by the Xamin.exe file to the host system;
   scanning for operating system characteristics including operating system version, build, and service pack version;
   scanning security information including screen saver activity, password protection, timeout, legal notice text and caption, default background image display, automatic logon, last user displayed, shutdown procedure, restricted sessions, minimum password length, minimum and maximum password age, password history, lockout duration, lockout window, lockout threshold, installation of registry key, and password filtering;
   parsing data obtained by scanning the client system; and
   generating output files containing the parsed data.

2. The method of claim 1, further comprising scanning for Ethernet adapters.

3. The method of claim 1, further comprising scanning for computer name.

4. The method of claim 1, further comprising scanning for antivirus installation including last virus scan and last virus update.

5. The method of claim 1, further comprising scanning for mounted drive information including: file system type, case preservation, case sensitive support, unicode support, persistent access control list (ACL) support, file compression support, compression of volume, encrypting file system (EFS) support, object identification support, and reparse points support.

6. The method of claim 1, further comprising scanning for local user information including: username, full name, privileges, disabled, locked out, comment, user comment, password required, password change capability, password age, password expiration, password expiration date, last logon date, and support of reparse points.

7. The method of claim 1, further comprising scanning for services including service name and status of the service.

8. The method of claim 1, further comprising scanning for audit policy information including auditing enabled, type of auditing, event auditing, object access auditing, privilege use auditing, process tracking auditing, policy change auditing, account management auditing, directory service access auditing, and account logon auditing.

9. The method of claim 1, further comprising scanning for shared drive information including share name, share type and share comments.

10. The method of claim 1, further comprising scanning for trusted domain information.

11. The method of claim 1, further comprising scanning for uniform resource locators.

12. The method of claim 1, further comprising scanning for installed applications.

13. A computer system, comprising:
   means for storing a Xamin.dll file, a Xamin.exe file, and a Xamincli.exe file in a common directory, the Xamin.dll file performing backend processing for the Xamin.exe file and the Xamincli.exe file;
   means for adding a command line version of a security program to a client system's login script on a primary domain controller, such that the client system's Internet activity is evaluated upon login to a domain;
   means for receiving a call for the Xamin.dll file;
   means for performing a security evaluation of the client system;
   if the security evaluation is performed by a manual run, then means for executing the Xamin.exe file from the client system and for writing an output created by the Xamin.exe file to the client system;
   if the security evaluation is performed by login script, then i) means for establishing a logon connection between a host system and the client system through a network, ii) means for executing the Xamin.exe file from the host system, and iii) means for writing the output created by the Xamin.exe file to the host system;
   means for scanning for operating system characteristics including operating system version, build, and service pack version;
   means for scanning security information including screen saver activity, password protection, timeout, legal notice text and caption, default background image display, automatic logon, last user displayed, shutdown procedure, restricted sessions, minimum password length, minimum and maximum password age, password history, lockout duration, lockout window, lockout threshold, installation of registry key, and password filtering;
   means for parsing data obtained by scanning the client system; and
   means for generating output files containing parsed data.

14. The system of claim 13, further comprising means for scanning for Ethernet adapters.

15. The system of claim 14, further comprising means for scanning for a computer name.

16. A computer program stored on computer-readable storage media, the computer program, executed by a processor, causes the processor to:
   store a Xamin.dll file, a Xamin.exe file, and a Xamincli.exe file in a common directory, the Xamin.dll file performing backend processing for the Xamin.exe file and the Xamincli.exe file;
   add a command line version of a security program to a client system's login script on a primary domain controller, such that the client system's Internet activity is evaluated upon login to a domain;
   receive a call for the Xamin.dll file;
   perform a security evaluation of the client system by manual run or by login script;
   if the security evaluation is performed by manual run, then execute the Xamin.exe file from the client system and write an output created by the Xamin.exe file to the client system;
   if the security evaluation is performed by login script, then i) establish a logon connection between a host system and the client system through a network, ii) execute the Xamin.exe file from the host system, and iii) write the output created by the Xamin.exe file to the host system;
   scan for operating system characteristics including operating system version, build, and service pack version;
   scan security information including screen saver activity, password protection, timeout, legal notice text and caption, default background image display, automatic logon, last user displayed, shutdown procedure, restricted sessions, minimum password length, minimum and maximum password age, password history, lockout duration, lockout window, lockout threshold, installation of registry key, and password filtering;
   parse data obtained by scanning the client system; and generating output files containing the parsed data.

17. The computer program of claim 16, wherein the computer-readable storage medium is a disk.

\* \* \* \* \*